July 17, 1934.   J. A. OLIVIER   1,966,514
COLLAPSIBLE TOP CONSTRUCTION FOR VEHICLE BODIES
Filed June 29, 1931
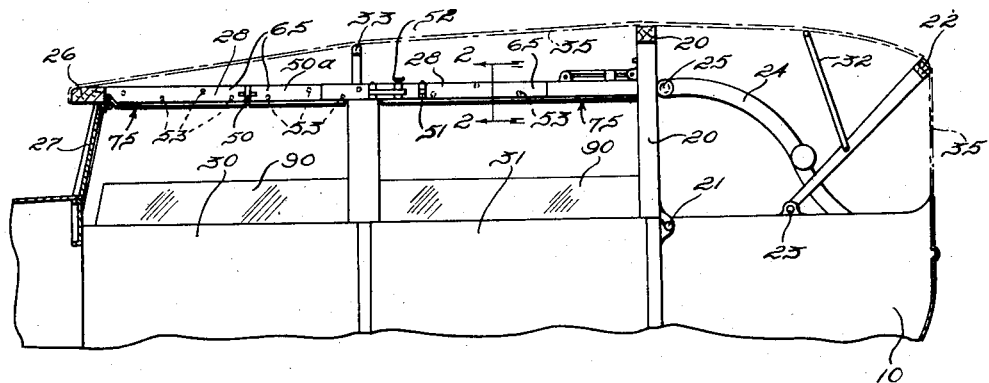
FIG. 1.
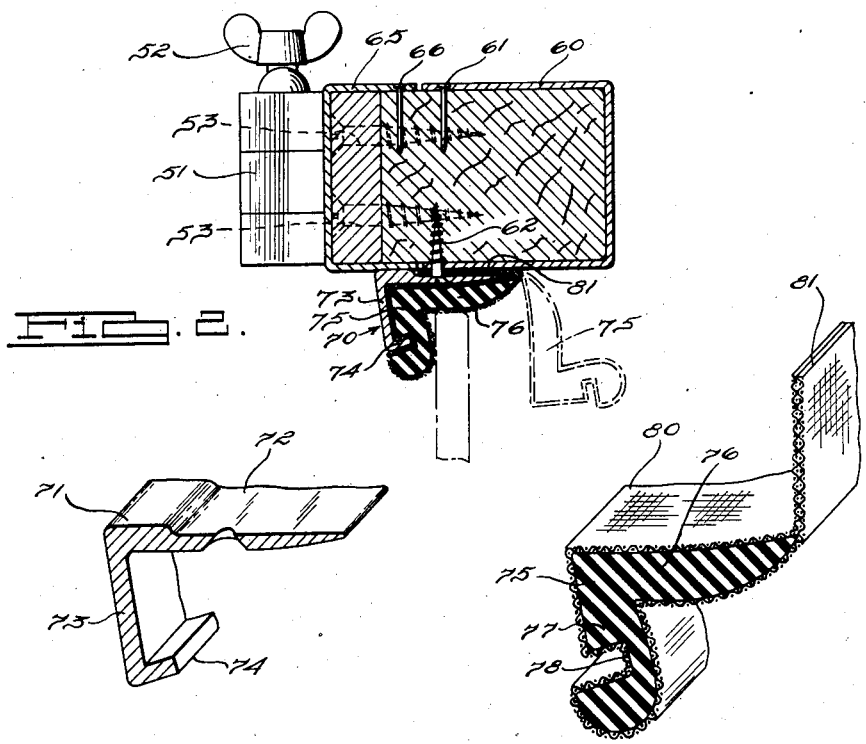
FIG. 2.
FIG. 3.
FIG. 4.
INVENTOR
Jules A. Olivier.
BY
Harness, Dickey, Pierce & Hann
ATTORNEYS Patented July 17, 1934

1,966,514

UNITED STATES PATENT OFFICE 1,966,514

COLLAPSIBLE TOP CONSTRUCTION FOR VEHICLE BODIES

Jules A. Olivier, Detroit, Mich., assignor to Dietrich, Incorporated, a corporation of Michigan Application June 29, 1931, Serial No. 547,583

10 Claims. (Cl. 296—1)

The object of my invention is to provide a novel finish trim and retaining means therefor, for the folding side rails of a collapsible vehicle top.

With this, and other objects in view, my invention consists in the combination, construction and arrangement of parts, described and claimed in the following specification and shown in the accompanying drawing in which Figure 1 is a longitudinal vertical sectional view of a collapsible top mounted upon an automobile body and embodying my invention.

Fig. 2 is a detailed sectional view taken on line 2—2 of Figure 1.

Fig. 3 is a fragmentary perspective view of a weather strip retaining member utilized in conjunction with the construction embodying my invention.

Fig. 4 is a fragmentary perspective view of the weather strip used in connection with the retainer shown in Fig. 3.

The vehicle body generally is designated by the numeral 10 and upon it is mounted a collapsible top construction comprising a main bow member 20 pivotally connected at its ends to the rear side portions of the body at the rear edges of the rear door openings as at 21. A rear bow 22 pivotally connected at its ends to the rear side portions of the vehicle body as at 23; folding brace members 24 pivotally connected to the upper side portions of the main bow 20 as at 25 and to rear side portions of the body 10. A forward windshield header member 26 adapted to lie along the top of the windshield 27 and to be releasably secured thereto in the conventional manner. Folding side rail members 28 extend between the upper side portions of the main bow 20 and the windshield header 26 above the front and rear doors 30 and 31. An auxiliary folding bow 32 is pivotally mounted on the intermediate side portions of the rear bow 22 and another auxiliary folding bow 33 is pivotally mounted upon the intermediate portions of the side rails 28. A flexible cover material 35 is spread upon the collapsible top frame members secured at its forward end to the windshield header 26 and at its rear end and rear side portions to the upper rear and rear side portions of the body 10.

My invention has to do particularly with the side rails 28. These are provided with hinges 50 and 51 intermediate their edges and with clamping mechanisms 52. The hinges 50 are provided with wing plates 50a which extend along the inner sides of the rails in each direction from the hinge 50 and are secured to the rails by numerous screws 53.

The hinge member 51 is likewise provided with a plate which extends rearwardly of the hinge point 51 along the inner side of the rail 28 and is secured thereto by numerous screws or other similar fastening means 53. The side rails 28 are usually made of wood and in order to give a finished appearance to the body it is necessary that their exposed surfaces be finished, which involves labor and expense. It is also necessary that the wing plates of the hinge members 50 and 51 which extend along and are secured to the inner sides of the rails 28 be finished and polished to provide a suitable appearance. This also involves considerable expense as these hinges and their plates are, in the higher class bodies of the type disclosed, formed of castings and to finish them involves expensive buffing and polishing operations, and then even though these hinge plates are suitably finished and polished and the exposed portions of the rails 28 are also finished, the exposed surfaces of the rail portions and of the hinge plate portions do not match. The screws 53 securing the hinge plates to the side rail are always exposed, and their heads must be finished to conform with the finish of the other parts. Thus the appearance of the inner surfaces of these side rails, which are always exposed to the view of the occupants of the vehicle when the top is up, contains a great many inharmonious details.

In order to eliminate these objectionable features and to save the expense of finishing the various members mentioned, I have designed trim members to be secured upon and to cover the interior surfaces of the side rails and also the exterior surfaces, which trim means is also utilized as a retainer for the screws or other means fastening the hinge plate to the side rails, and which provides as well a protection for the exposed wood portions of the rails. I have designed such trim means so that it may be easily applied to the rails and removed therefrom when necessary to repair or adjust the rails and their hinges. This trim means comprises a sheath or cover of metal that will take a suitable finish, and which is bent to conform to the shape of the side rails, and may be applied thereto in sections and will provide a uniform appearance. This trim means is shown in section in Figure 2 and comprises a channel shaped metal sheath 60 covering the outer top sides, the outer sides and the outer bottom sides of the rails. This sheath may be secured to the rails along its upper inner edge by means of nails 61 or other suitable means and along its lower inner edge by means of screws 62 or nails or other suitable means, which are also utilized to secure the weather stripping along the underside of the rails, as will be explained. The other portion of the trim means comprises channel shaped metal sheath 65 which covers the inner sides, the inner top and under portions of the rails and which extend over the length of the rails between the hinge points, sufficient clearance being allowed between the ends of the various sections 65 to permit the free operation of the hinge pivots and of the clamping device 52. The upper outer edges of the sheath members 65 are secured to the top sides of the rails by means of nails or other suitable means 66 and the lower edges of the sheath member 65 are inserted beneath and retained against the undersides of the rails by the weather stripping and closure abutment member 70.

This member 70 comprises a metal retainer member 71 as shown in Figure 3 having an extended base portion 72, an upstanding wall portion 73 and an angular flange 74 on the free edge of the wall portion 73, and the filler member comprises a rubber portion 75 having a base portion 76 adapted to lie upon the base 72 of the retainer member and having an upstanding wall portion 77 adapted to lie against the inner surface of the upstanding wall portion 73 of the retainer and provided with a notch or groove 78 in the upstanding wall portion 77 adapted to receive the angular flange 74 of the retainer. The filler member 75 is covered with a suitable fabric 80, the ends of which are extended beyond the end of the base portion 76 as shown in Figure 4 to provide an extended selvege portion 81 which is lapped back over the outer side of the base portion 72 of the retainer and which when the assembly is applied to the side rail, is retained between the exterior surface of the base portion 72 of the retainer and the adjacent surfaces of the side rail as shown in Figure 2. This weather strip and closure abutment assembly is mounted to the undersides of the rails by means of screws 62 or similar means inserted through suitable openings in the base 72 of the retainer and through the lower inner edge of the trim member 60. The base portion 72 of the weather strip retainer is extended inwardly of the side rails a sufficient distance beyond the lower inner edge of the sheath member 60 to substantially overlap and bear against the lower outer edge of the sheath member 65 and to thereby provide means for retaining the lower edge of the sheath member 65 against the lower surface of the side rails. The outer cushioned face of the member 70 provides an abutment for the top edges of the windows 90 in the doors 31 and 32.

Whenever it is necessary to repair or adjust the hinge members 50 and 51 or to tighten the hinge plate retaining screws 53 the finish member 65 may be readily removed by merely removing the nails 66 and sliding the trim member off the rail without disturbing the outer trim member 60 or the weatherstripping assembly 70. These trim sheaths may be finished to provide a uniform appearance and may be readily arranged to cover substantially all of the exterior surface of the rails as well as all of the interior and bottom surfaces except the points at which clearance is allowed for the operation of the hinges 50 and 51 and the clamping mechanism 52. It is then not necessary to finish the wood rails, the screws used to secure the hinge plates or the hinge plates themselves. The only parts that need to be finished are the relatively small exposed portions of the hinge members at the pivot points and the exposed portions of the clamping members 52.

These finish members may also be applied to the windshield header member 26, and they furnish means for retaining the screws 53, which secure the hinge plates from working loose and becoming lost. They reinforce and add to the rigidity of the rail members and help to prevent the hinge plates from working loose and rattling against the wood rails. The combination of the weatherstrip and abutment member 70 with the finish members conceals the joint between the lower abutting edges of the trim sheaths and provides a retaining means which operates upon being struck by the edes of the windows to force the lower edges of the inner sheath 65 against the rail, and this constantly acts to prevent this edge of the sheath from working loose.

Formal changes may be made in the specific embodiment of the invention described without departing from the spirit and substance of the broad invention, the scope of which is commensurate with the appended claims.

I claim:

1. A vehicle top frame member having a finishing sheath comprising a pair of channels disposed in facing relation upon opposite sides of the member, means securing one flange of one channel to the member and means holding the other flange of said channel solely by lateral pressure against the frame member.

2. A vehicle top frame member having a finishing sheath comprising two longitudinally extending face portions having substantially abutting edges, means upon the edges of one of the portions clamping the edges of the other portion in position solely by lateral pressure, the latter portion being removable by sliding it from under the clamping member without disturbing the other finishing member.

3. A finish sheath for a vehicle top frame member comprising a pair of inwardly facing channels and a clamping member adapted to be secured upon one flange of one of the channels to support said flange and to extend over and hold the flange of the other channel in position by clamping action.

4. A finish assembly for a vehicle top frame member comprising a pair of inwardly facing channels, a weatherstrip for covering the space between the edges of the flanges of the channels, said weatherstrip being secured upon the flange of the first mentioned channel member and providing an anchor for said flange and being positioned to extend over a flange of the other channel member and to press said flange into engagement with the frame member.

5. A top frame element for a vehicle comprising a base member made of wood of a cross-section sufficient to provide the strength required thereof, a finish sheath for the member comprising oppositely disposed channel elements made of thin sheet material mounted with the flanged ends in substantially abutting relation, tacks for securing two substantially abutting flanges to said members and an element for securing a third flange, said element being extended to engage and retain the fourth flange against said frame element.

6. A top frame element for a vehicle comprising a base member having a sheath attached thereto, a securing element spanning two adjacent flanges of said sheath and having a recess formed therein, and a strip of flexible material on said frame element having a portion retained in the recess of said securing element.

7. A top frame member for a vehicle having an encompassing sheath disposed thereon with at least two flanges in abutting relation, a weather-strip of flexible material, a securing element for clamping one edge of said material, and said two abutting flanges to the frame member, and means on said securing element for releasably supporting the other edge of said material.

8. A top frame member for a vehicle made of wood and having hinge plates secured thereto, a sheath for said member made of metal which encompasses said plates and member to form a smooth surface which may readily be finished.

9. A top frame member for a vehicle made of wood and having hinge plates secured thereto by screws, a sheath for said member made of metal which encompasses said plates and member to form smooth surfaces which may readily be finished and which forms a cover for said screws.

10. A top frame member for a vehicle made of wood and having hinge plates secured thereto, a sheath for said member made of metal which encompasses said plates and member to form a smooth surface and having a pair of abutted flanges, and a clamping element secured to one of said flanges and pressed against the other of said flanges to releasably retain the latter flange clamped against said member.

JULES A. OLIVIER.